United States Patent [19]

Shaughnessy et al.

[11] 3,902,557

[45] Sept. 2, 1975

[54] TREATMENT OF WELLS

[75] Inventors: Christopher M. Shaughnessy; Clay Gruesbeck, Jr.; James R. Looney; William N. Salathiel, all of Houston, Tex.

[73] Assignee: Exxon Production Research Company, Houston, Tex.

[22] Filed: Mar. 25, 1974

[21] Appl. No.: 454,521

[52] U.S. Cl. ............... 166/295; 166/305 R; 166/307; 166/281
[51] Int. Cl.² ................. E21B 33/138; E21B 43/27
[58] Field of Search ........ 166/295, 304, 305 R, 312, 166/281, 307; 252/8.55 B, 8.55 C, 8.55 D

[56] References Cited
UNITED STATES PATENTS

| | | |
|---|---|---|
| 3,131,759 | 5/1964 | Slusser et al. ................... 166/305 R |
| 3,308,068 | 3/1967 | Jones ................................... 252/8.5 |
| 3,395,757 | 8/1968 | Crossland .......................... 166/304 |
| 3,481,403 | 12/1969 | Gidley et al. ....................... 166/295 |
| 3,827,497 | 8/1974 | Dycus et al. ....................... 166/274 |

*Primary Examiner*—Stephen J. Novosad
*Assistant Examiner*—George A. Suckfield
*Attorney, Agent, or Firm*—Robert L. Graham

[57] ABSTRACT

A method of treating a subterranean formation surrounding a well wherein a solvent including a $C_4$ to $C_{10}$ alkyl ether of polyglycol ether containing from 10 to 22 carbon atoms per molecule is injected into the formation. The solvent improves permeability to the formation adjacent the wellbore. The solvent may be used as a preflush or afterflush for, or in combination with, other treating agents; or it may be used as the sole essential treating agent.

28 Claims, 6 Drawing Figures

TREATMENT OF WELLS

BACKGROUND OF THE INVENTION

1. Field of the Invention

This invention relates to the treatment of formations surrounding oil wells, gas wells, injection wells, and similar boreholes by the injection of a solvent therein. In one aspect it relates to the treatment to remove formation damage. In another aspect it relates to a conditioning fluid used either before, after, or with another well treating agent.

2. Description of the Prior Art

Many techniques used to increase or stimulate the production of oil wells and gas wells involve the use of solvents to alter the composition of fluids in the formation or impart certain desired properties to formation rock. The particular effect or function of the solvent depends upon the type of treatment employed. For example, in treatments designed to remove formation damage caused by hydrated clays, the primary function of the solvent is to displace resident fluids radially outwardly from the damaged zone adjacent the wellbore and extract water from the clays (see Society of Petroleum Engineers Paper No. 905). Solvents are also used to dissolve mineral deposits such as asphaltenes, scales or other insolubles which have been deposited in the critical flow area surrounding the wellbore (see U.S. Pat. No. 2,124,530).

The treatments mentioned above employ solvents as the sole treating agent, the principle function of which is to remove the damaging material from the critical flow area in the vicinity of the wellbore and thereby restore original permeability.

In other applications, solvents have been used as an adjunct to other stimulating or treating agents. In the consolidation of incompetent sandstone formations, for example, solvents are commonly used to precondition the interval to be consolidated with the consolidating agent, usually a synthetic resin (see U.S. Pat. No. 3,481,403). Solvent preflushes are also employed to remove connate fluids and precondition the formation for acidizing treatments (see U.S. Pat. No. 3,254,718). Solvents have been found useful as afterflush treatments for sandstone acidizing to render the sand and clay particles in the immediate vicinity of the wellbore water wet and thereby prevent the formation of emulsions (see U.S. Pat. Nos. 3,481,404 and 3,548,945).

The solvents which have been proposed for use in the treatments mentioned above include alcohols, aldehydes, ketones, amines, kerosene, acetone, and glycol ethers of methyl, ethyl, propyl and butyl alcohols.

SUMMARY OF THE INVENTION

The present invention provides an improved method for treating subterranean, hydrocarbon-producing formations to improve or restore formation permeability adjacent the wellbore or precondition the formation for other treating agents.

Broadly, the invention comprises injecting into the formation a $C_4$–$C_{10}$ alkyl ether of a polyglycol which is at least partially miscible with oil and water and contains from 10 to 22 carbon atoms per molecule. The solvent, which may be used in pure form or with a suitable organic diluent, may be employed as the sole essential treating agent or it may be used as a preflush, afterflush, or in combination with other treating agents.

In certain applications, specifically sand consolidation and sandstone acidizing, the preferred solvent is a $C_4$ to $C_8$ monoalkyl ether of tri- or tetra- ethylene glycol.

The improved results obtained by employing the polyglycol ethers in accordance with the present invention are not fully understood. Laboratory tests, however, indicate that the effectiveness of polyglycol ethers is due to (1) their solvency for both oil and water, (2) their moderate surface activity, and (3) their ability to render formation particles water wet. Other properties or phenomena may also be involved but, as discussed in detail hereafter, the combined effect of solvency, surface activity, and wettability properties of the polyglycol ethers appears to contribute substantially to the success of the present invention.

DESCRIPTION OF THE PREFERRED EMBODIMENTS

The solvents useful for the purposes of the present invention include $C_4$–$C_{10}$ alkyl ethers of polyglycols containing from 10 to 22 carbon atoms per molecule. The preferred ethers are monoalkyl ethers of poly(ethylene glycol) having the following formula:

$$H(OCH_2CH_2)_nOC_mH_{(2m+1)}$$

Where $n$ is an integer of 3 to 6, and preferably an integer of 3 or 4; and $m$ is an integer of 4 to 10, and preferably an integer of 4 to 8.

Preferred polyglycol ethers include $C_4$–$C_8$ monoalkyl ethers of tri- or tetra- ethylene glycol.

Alkyl groups less than $C_4$ do not provide sufficient oil solubility to balance the aqueous solubility in this class. Alkyl groups larger than $C_{10}$ confer a larger degree of surface activity than is desirable for purposes of this invention. In certain applications, a highly surface active material can promote oil and water emulsions in the formation. Moreover, certain surfactants can result in oil wetting of formation sands and clays which would reduce relative permeability to oil. Specific poly(ethylene glycol) ethers include triethylene glycol butyl ether, triethylene glycol hexyl ether, triethylene glycol decyl ether, tetraethylene glycol butyl ether, tetraethylene glycol hexyl ether, and tetraethylene glycol decyl ether. These materials possess properties which make them highly suitable for treating subterranean formations: they have mutual solvency for both oil and water which aids in the miscible displacement mechanism in removing resident fluids from the pores of the formation adjacent the wellbore; they tend to break emulsions and render the formation particles water wet which improves the formations' relative permeability to oil; they do not react with other treating agents to produce precipitates or materials that would plug formation pores; they possess moderate surface activity which aids in both the displacement mechanism and water wetting of sand; and they are miscible with a variety of diluents.

The poly(ethylene glycol) alkyl ethers useful in the present invention may be made by reacting a $C_4$ to $C_{10}$ alkyl alcohol with ethylene oxide in a weight ratio ranging from about 1:0.8 to about 1:2.5, preferably from about 1:1 to about 1:2.25. The reaction product in each case is a mixture comprising a range of polyglycol ethers containing a terminal $C_4$ to $C_{10}$ alkyl group. This reaction produces a molecular weight distribution of polymer homologues corresponding to the well known Poisson distribution (See *Nonionic Surfactants*, Norman Shachat and Harold L. Greenwold, Marcel Kekker, Inc., New York, 1967, ed. M. J. Schick). Reference to a specific material (e.g. tetraethylene glycol monohexyl ether) generally means that such material is present in the composition in significant amounts. The reaction products of the mixed alkyl alcohols and ethylene oxide may be further treated to isolate individual polyglycol ethers if desired. For reasons of economics, however, it is preferred that the reaction mixtures be used without further alteration except to the extent that they are used with diluents or other treating agents.

The polyglycol ethers may be used in undiluted form. Preferably, however, as described in detail below, they are mixed with a suitable diluent for injection into the formation. Diluents include organic materials such as alcohols, ketones, acetone, diesel fuel oil, LPG, toluene, xylene, condensate, light crude oil, or mixtures of these. The volumetric ratio of polyglycol ethers and diluent will vary depending on the type of treatment contemplated. Normally, the diluent will constitute the major volume proportion of the treating fluid.

Several laboratory experiments were conducted to determine (1) the effect of the polyglycol ethers on relative permeability of formation sand containing substantial amounts of clay, (2) mutual solvency of the polyglycol ethers, (3) the effect of the polyglycol ethers as a preflush for sand consolidation treatments, (4) surface activity of the polyglycol ethers, and (5) the ability of the polyglycol ethers to break emulsions and water wet siliceous material. These experiments are described separately below.

The permeability of formations containing clay minerals can be reduced by water-miscible polar organic compounds. This reduction of permeability can occur because of the direct interaction of the polar solvent with clay minerals or because of precipitation of inorganic salts from connate fluids due to presence of the solvent.

In order to demonstrate the effectiveness of the polyglycol alkyl ethers in maintaining high permeability in formations that contain clay minerals, comparative tests were run using (1) mixtures of tetraethylene glycol monohexyl ether and isopropanol, and (2) a polar organic compound (isopropanol).

An aggregate consisting of Brazos River sand and clay was packed into three teflon sleeves 6 inches in length and 1 inch in diameter. The composition of the aggregate was as follows:

| Mineral | Weight Percent |
|---|---|
| Quartz | 53.3 |
| Feldspar | 9.9 |
| Calcite | 6.1 |
| Amorphous | 21.3 |
| Montmorillonite | 7.1 |
| Illite | 1.8 |
| Kaolinite | 0.5 |
| | 100.0 |

Initially, the three aggregate samples were saturated with brine and the single phase permeability of brine measured.

Figure 1:
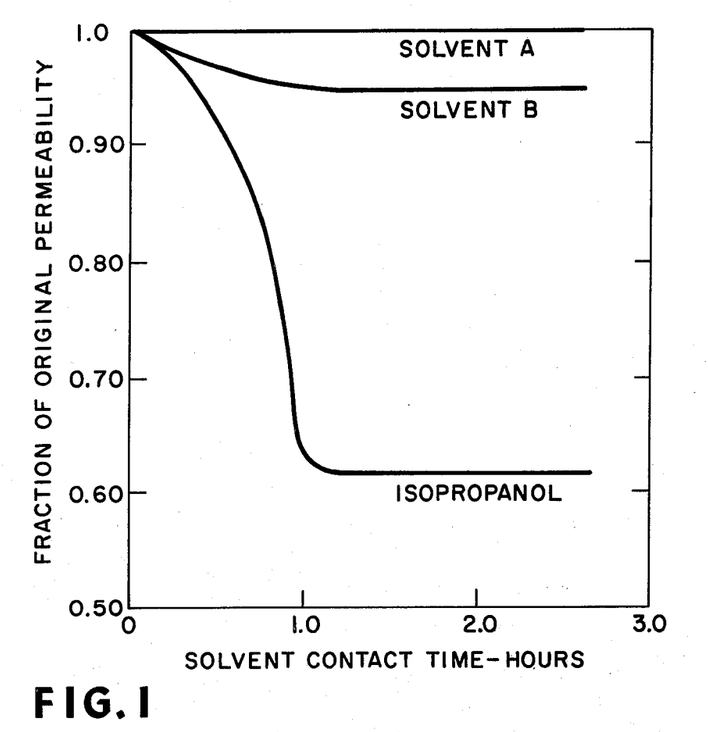
FIG. 1 is a plot showing the effect of various solvents on permeability of sandstone samples.

Each test involved determining the permeability of the aggregate during displacement of the brine with a solvent. The solvents used were: (1) Isopropanol, (2) a solution of 25% by weight of tetraethylene glycol monohexyl ether and 75% by weight of isopropanol (solvent B) and (3) a solution of 70% by weight tetraethylene glycol monohexyl ether and 30% by weight of isopropanol (solvent A). A total of 100 cc of solvent were used in each test. The permeability of each sample was determined at equally spaced time intervals. FIG. 1 is a plot showing the effect of permeability retention as a function of solvent contact time. The following table compares the stabilized permeabilities obtained for the three samples.

Table I

| Solvent | Initial Permeability (to Brine), md | Final Permeability (to Solvent), md |
|---|---|---|
| Isopropanol | 740 | 464 |
| Solvent B | 509 | 481 |
| Solvent A | 509 | 574 |

It is apparent from FIG. 1 which presents these data that the solvents containing the polyglycol ether had far less effect on permeability than isopropanol which interacts with the clays to partially plug the aggregate. This interaction does not appear to occur with the polyglycol monoalkyl ethers.

The following laboratory experiments illustrate the mutual miscibility of poly(ethylene glycol) alkyl ethers for oil and water. Mixed isomers of hexyl alcohol were reacted with ethylene oxide in a weight ratio of 1:1.73 to produce a mixed polyglycol ether. The polyglycol ether was diluted with isopropanol forming a solvent (identified as solvent A on FIGS. 1 and 2) comprising 70 weight percent polyglycol ether and 30 weight percent isopropanol. Several mixtures of brine and No. 2 diesel fuel were prepared in volume ratios of 1:0 to 9:1. Solvent was added to these two phase mixtures at 70°F until a single unclouded phase was obtained. This composition indicated the boundary between the single phase and the two phase regions. Additional data were taken on the miscibility of the solvent with the brine alone and with diesel fuel alone.

Similar data were obtained using other solvents. The following table identifies the solvents used to prepare the ternary phase diagrams shown in the drawings.

Table II

Figure 2:
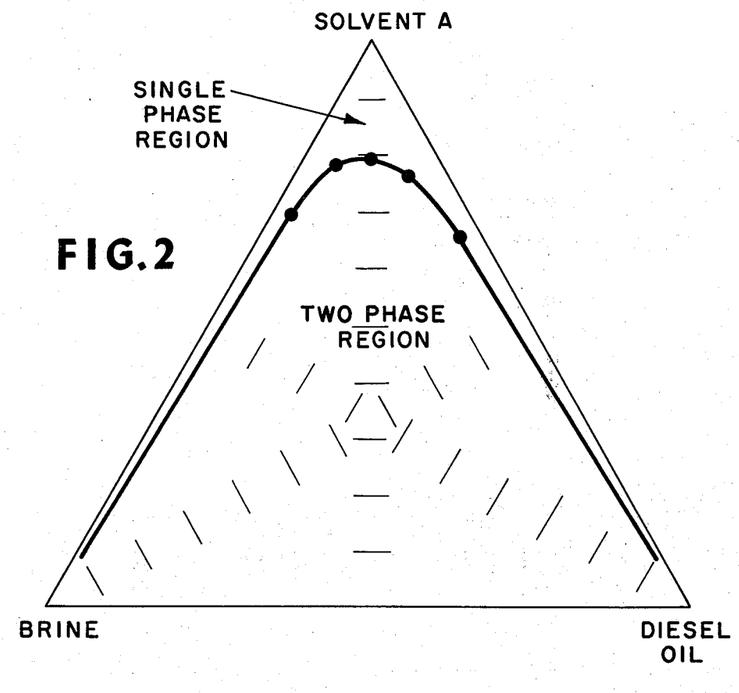
FIGS. 2–6 are ternary phase diagrams for certain polyglycol alkyl ethers useful in the present invention and developed with salt water and diesel oil.
Figures 3, 4, 5:
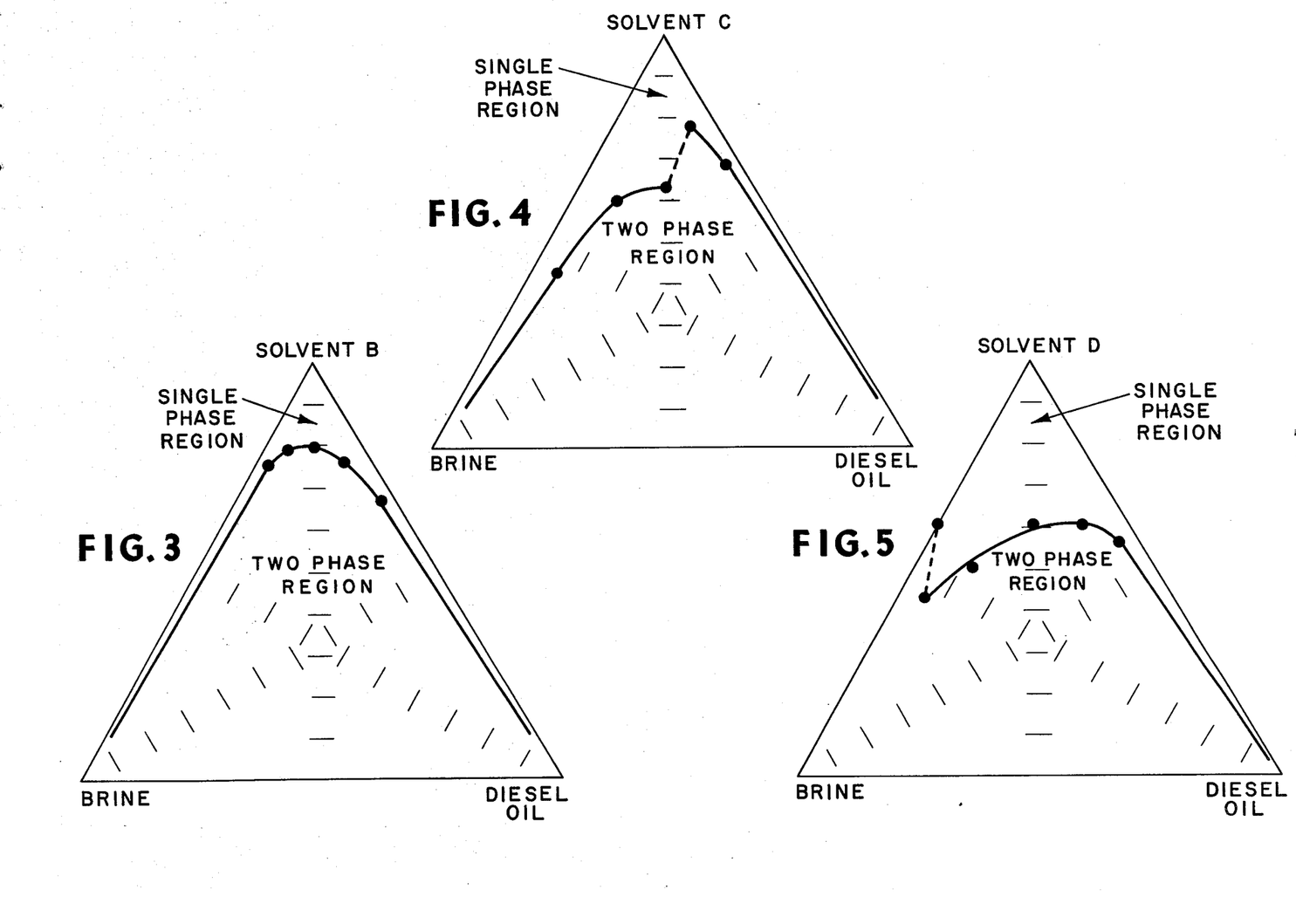
Figure 6:
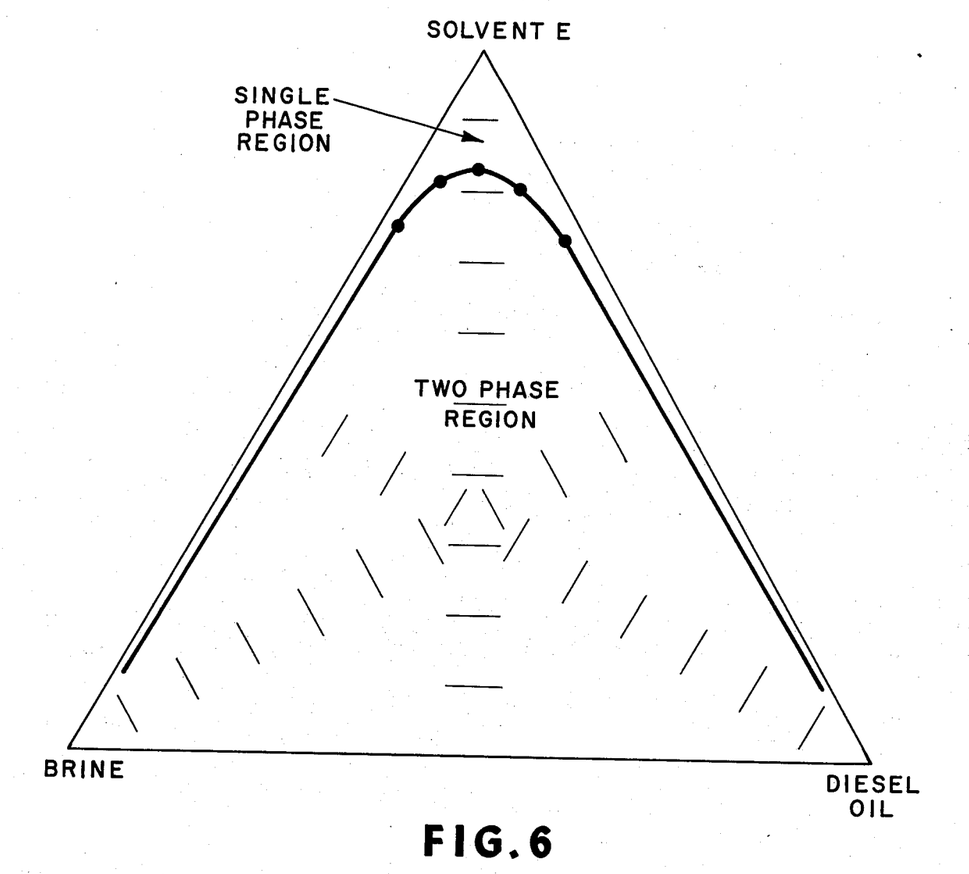

| Solvent | Polyglycol Ether | wt. % | Diluent | Vol. % | Drawing |
|---|---|---|---|---|---|
| A | Tetraethylene glycol mono-hexyl ether | 70 | Isopropanol | 30 | FIG. 2 |
| B | Tetraethylene glycol mono-hexyl ether | 25 | Isopropanol | 75 | FIG. 3 |
| C | Tetraethylene glycol mono-hexyl ether | 100 | — | | FIG. 4 |
| D | Triethylene glycol mono-hexyl ether | 100 | — | | FIG. 5 |
| E | Triethylene | 100 | — | | FIG. 6 |

Table II-Continued

| Solvent | Polyglycol Ether | wt. % | Diluent | Vol. % | Drawing |
|---|---|---|---|---|---|
| | glycol mono-butyl ether | | | | |

The boundary between the two phase and single phase regions for the three-component system is plotted in the drawings for each solvent. As reflected by the large single phase area, each solvent exhibits high degree of miscibility with both brine and oil.

In order to demonstrate the effectiveness of polyglycol ethers as preflush for sand consolidation treatments, tests were run comparing the effect of ethylene glycol monobutyl ether and tetraethylene glycol monohexyl ether on separate sand samples. Each sand sample consisted of Brazos River sand packed into rubber sleeve 34 inches long and 1¼ inches in diameter. Initially, the samples were saturated with brine and were flooded with 2000 cc of No. 2 diesel oil to establish oil saturation.

In order to condition the sand for treatment with an epoxy resin, the sample was first acidized using conventional acid solutions. Sixty cc of 15% of aqueous solution of HCl was injected into the sample followed by the injection of 125 cc of mud acid (12 volume % HCl and 3 volume % HF) containing one-half volume % of a commercial corrosion inhibitor. An afterflush solution consisting of 10 volume % of a solvent, 5 volume % of a demulsifying agent, and 85 volume % of No. 2 diesel oil was injected into the sample after the acid solutions. The solvent consisted of 25% by weight of tetraethylene glycol monohexyl ether and 75% by weight of isopropyl alcohol. A total of 190 cc of the solvent solution was injected into the sample. This concluded the acid treatment and prepared the sample for the consolidation treatment.

Initially, a preflush of a solvent consisting of 25% by weight of tetraethylene glycol monohexyl ether and 75% by weight of isopropyl alcohol was injected into the sample. A total of 125 cc of the solvent was used. Ninety cc of an epoxy solution was injected into the resin. The resin solution consisted of 85% by weight of Araldite 6005 sold by Ciba-Geigy Company, 14.5% by weight of acetone and 0.5% by weight of a coupling agent sold as Z-6020 by Dow Chemical Company. Following injection of the resin solution, the sample was permitted to set for 45 minutes. A catalyst solution was then injected into the sample. The catalyst solution consisted of 2.5 volume percent of a tertiary amine sold as DMP-30 by Rohm and Haas and 97.9 volume percent of white oil. The sand sample was then permitted to cure for 18 hours. During the test, the sample was maintained at about 160°F to simulate reservoir temperature.

Following cure, the consolidated sample was removed from the sleeve and cut at one-inch intervals along the axis of the sample for compression tests. Various 1-inch cylindrical samples were placed between plates and a compressive axial force was applied until the sample cracked. The load was recorded for each failure and the failure pressure calculated.

The treatment of the second sand sample was the same except that the solvent employed was ethylene glycol monobutyl ether. The acid afterflush consisted of 10 volume percent of ethylene glycol monobutyl ether and 90 volume percent of No. 2 diesel fuel oil. The preflush solution for the sand consolidation treatment was undiluted ethylene glycol monobutyl ether. Following cure, the second sample was cut at one-inch intervals for compression tests.

The following table compares compressive test data obtained for the two sand samples, one using tetraethylene glycol monohexyl ether as the solvent and the other using ethylene glycol monobutyl ether as the solvent.

Table III

| Compressive Test Sample | Location of Test Sample from Injection Point (inches) | Compressive Stress at failure (psi) |
|---|---|---|
| Sample No. 1 | 1 | 1790 |
| (treated with tetra- | 2 | 7540 |
| ethylene glycol | 3 | 10100 |
| monohexyl ether) | 14 | 7090 |
| | 16 | 6760 |
| | 18 | 2770 |
| | 22 | 1220 |
| | 23–34 | unconsolidated |
| Sample No. 2 | 1 | 200 |
| (treated with | 2 | 1590 |
| ethylene glycol | 3 | 3540 |
| monobutyl ether) | 6 | 3260 |
| | 7 | 3180 |
| | 11 | 3670 |
| | 12 | 4110 |
| | 16 | 3700 |
| | 17 | 3650 |
| | 19–34 | unconsolidated |

It should be emphasized that the only difference between the treatment of Sample No. 1 and Sample No. 2 was the afterflush for the acid and the preflush for the resin. The treatment which employed the tetraethylene glycol monohexyl ether not only provided for higher compressive strength but also resulted in much deeper resin penetration.

Tests were also run to determine the reduction of surface tension of aqueous solutions of tetraethylene glycol monohexyl ether (TEGMHE), ethylene glycol monobutyl ether (EGMBE), and a typical commercial surfactant (polyoxyethylene sorbitan monolaurate) sold under the trade name Tween 20. The results of these tests are presented in Table IV.

Table IV

| TEGMHE | | EGMBE | | TWEEN-20 | |
|---|---|---|---|---|---|
| Concentration (grams/liter) | Surface Tension (dynes/cm.) | Concentration (grams/liter) | Surface Tension (dynes/cm.) | Concentration (grams/liter) | Surface Tension (dynes/cm.) |
| 0 (water sample) | 71.7 | 0 (water sample) | 71.7 | 0 (water sample) | 71.7 |
| 0.010 | 67.8 | 0.009 | 70.1 | 0.0001 | 59.1 |
| 0.039 | 64.6 | 0.036 | 69.8 | 0.0005 | 52.2 |
| 0.138 | 60.1 | 0.126 | 69.0 | 0.0010 | 48.0 |
| 0.434 | 54.9 | 0.396 | 66.4 | 0.0040 | 41.0 |
| 1.025 | 51.6 | 0.936 | 63.3 | 0.0079 | 40.0 |
| 1.970 | 45.8 | 1.800 | 57.5 | 0.0362 | 37.1 |
| 9.760 | 36.6 | 8.910 | 50.4 | 0.1270 | 35.4 |
| 28.700 | 28.6 | 26.200 | 41.3 | 0.3980 | 35.0 |
| 89.600 | 27.5 | 81.800 | 30.1 | 0.9400 | 35.9 |

As reflected by the above Table, the EGMBE exhibited some surface activity, and the Tween 20 had a significant effect on surface tension even at very low concentrations. Highly surface-active materials such as Tween 20 are not recommended for use in the present invention because they tend to emulsify oil and water. Some degree of surface activity is desirable, however, because mutual solubility of oil and water is promoted by resulting solubilization phenomena. Further, alteration of the wetting preferance of formation solids is a surface phenomenon and is more readily achieved when the solvent is surface active. As the data indicates the surface activity of the tetraethylene glycol monohexyl ether falls between that of EGMBE and typical surfactants.

The following laboratory experiments demonstrated that the solvents useful in the present invention are capable of (1) preventing the formation of emulsions and (2) effectively water wetting siliceous material. The following samples were prepared and placed in separate beakers:

| Sample 1 | | | Sample 2 | | |
|---|---|---|---|---|---|
| Water Phase (brine) | 25 | ml | Water Phase (brine) | 25 | ml |
| Oil Phase: | | | Oil Phase: | | |
| Crude oil | 50 | ml | Crude oil | 50 | ml |
| No. 2 Diesel oil | 22.5 | ml | No. 2 Diesel oil | 22.5 | ml |
| Solvent (25 wt. % tetraethylene glycol monohexyl ether, 75 wt. % isopropanol) | 2.5 | ml | Solvent (70 wt. % tetraethylene glycol monohexyl ether, 30 wt. % isopropanol | 2.5 | ml |
| Silica Powder | 1.0 | gm | Silica Powder | 1.0 | gm |
| Bentonite (sodium montmorillonite) | 1.0 | gm | Bentonite (sodium montmorillonite) | 1.0 | gm |

| Sample 3 | | | Sample 4 | | |
|---|---|---|---|---|---|
| Water Phase (spent acid) | 25 | ml | Water Phase (spent acid) | 25 | ml |
| Oil Phase: | | | Oil Phase: | | |
| Crude oil | 50 | ml | Crude oil | 50 | ml |
| No. 2 Diesel oil | 22.5 | ml | No. 2 Diesel oil | 22.5 | ml |
| Solvent (triethylene glycol monohexyl ether) | 2.5 | ml | Solvent (tetraethylene glycol monohexyl ether) | 2.5 | ml |
| Silica Powder | 1.0 | gm | Silica Powder | 1.0 | gm |
| Bentonite (sodium montmorillonite) | 1.0 | gm | Bentonite (sodium montmorillonite) | 1.0 | gm |

The crude oil used in the above tests contains naturally occurring constituents which tend to oil wet siliceous materials and present serious emulsion problems. The spent acid was mud acid containing 0.5 wt. % of a corrosion inhibitor reacted with the silica powder and bentonite.

The test procedure for each sample was as follows:

After being sheared sufficiently to form an oil external emulsion or dispersion, the contents were poured into a 100 ml graduated cylinder. The amount of sediment, oil, and water separation and appearance of the sample were determined after ten minutes of sitting at room temperature (72°F). These data are presented in Table V under the heading "Room Temperature Test". The cylinder then was placed in a 140°F water bath for 3 minutes. After 5 minutes of sitting at room temperature, sediment, oil and water separation, and sample appearance were determined. These data are presented in Table V under the heading "140°F Test." In order to determine character of stabilized samples, the graduated cylinder was returned to the 140°F water bath for 1 hour and then permitted to sit at room temperature. Data was recorded after 24 hours of sitting. These data are presented in Table V under the heading "Stabilized Sample."

Table V

| SAMPLE 1: | | |
|---|---|---|
| Test | Cylinder Interval (ml) | Description |
| Room Temperature | 0–40 | Oil external emulsion (flocculated) No free brine or sediment |
| | 40–100 | Free oil |
| 140°F. | 0–32 | Oil external emulsion (flocculated) No free brine or sediment |
| | 32–100 | Free oil |
| Stabilized Sample | 0–14 | Intermixed water wet and oil wet sediment |
| | 14–31 | Free brine |
| | 31–34 | Oil external emulsion |
| | 34–100 | Free oil |

| SAMPLE 2: | | |
|---|---|---|
| Test | Cylinder Interval (ml) | Description |
| Room Temperature | 0–35 | Oil external emulsion (flocculated) No free brine or sediment |
| | 35–100 | Free oil |
| 140°F. | 0–8 | Water wet sediment |
| | 8–31 | Free brine |
| | 31–33 | Oil external emulsion |
| | 33–100 | Free oil |
| Stabilized Sample | 0–5 | Water wet sediment |
| | 5–30 | Free brine (no emulsion) |
| | 30–100 | Free oil |

| SAMPLE 3: | | |
|---|---|---|
| Test | Cylinder Interval (ml) | Description |
| Room Temperature | 0–1 | Trace of free water |
| | 1–35 | Oil external emulsion (flocculated) |
| | 35–100 | Free oil |
| 140°F. | 0–1 | Trace of free water |
| | 1–about 35 | Oil external emulsion (free water breaking out) |
| | about 35–100 | Free oil |
| Stabilized Sample | 0–2 | Water wet sediment |
| | 2–10 | Mixed water wet and oil wet sediment |
| | 10–28 | Free water |
| | 28–30 | Oil external emulsion |
| | 30–100 | Free oil |

| SAMPLE 4: | | |
|---|---|---|
| Test | Cylinder Interval (ml) | Description |
| Room Temperature | 0–1 | Trace of free water |
| | 1–37 | Oil external emulsion (flocculated) |
| | 37–100 | Free oil |
| 140°F. | 0–1 | Trace of free water |
| | 1–about 35 | Oil external emulsion (free water breaking out) |
| | about 35–100 | Free oil |
| Stabilized Sample | 0–3 | Water wet sediment |
| | 3–8 | Mixed water wet and oil wet sediment |
| | 8–29 | Free water |
| | 29–30 | Oil external emulsion |
| | 30–100 | Free oil |

Tests run on crude and brine samples as well as on crude and spent acid samples without solvent produced a rather tight oil external emulsion that did not break even after heating to 140°F and sitting for 24 hours.

The above data reveals that the polyglycol ethers are effective in breaking the emulsions and in water wetting siliceous particles, particularly at high temperatures.

As mentioned previously, the method of the present invention can be used to treat most any subterranean hydrocarbon-bearing formation where it is desired to displace resident fluids in the formation pore space adjacent to the wellbore. The following examples describe the use of the polyglycol alkyl ethers in treatments referred to as "Removal of Wellbore Damage," "Sand Consolidation," and "Sandstone Acidizing."

REMOVAL OF WELLBORE DAMAGE

In the drilling, completion, or operation of oil and gas wells, the permeability in the immediate vicinity of the wellbore frequently is reduced because of plugging by emulsions, asphaltenes, scales, or the swelling of certain clays such as montmorillonite. In order to restore permeability in this critical area, a solvent is frequently injected into the formation to repair the damage and restore permeability. The solvent should be capable of removing the plugging material, breaking emulsions, and rendering the formation particles water wet. It should also possess mutual solubility for both oil and water. Poly(ethylene glycol) alkyl ethers useful in the present invention appear to possess all these desirable properties as demonstrated by the laboratory experiments described above.

Large volumes of the solvents are normally used to restore permeability and to clean out perforations that may have been plugged during operation or completion of the well. Normally from 50 to 500 gallons per foot of the producing interval are used. Because of the relatively large volumes required, economics may dictate that the polyglycol ethers be diluted with an organic liquid such as an alcohol, aromatics, diesel oil or mixtures of these. It is preferred that the solvent solution consist of a major volume proportion of the diluent and a minor volume proportion of the polyglycol ether. A particularly suitable composition includes from 60 to 80 weight percent of tetraethylene glycol monohexyl ether and from 20 to 40 weight percent of an alcohol such as isopropanol. The ether-alcohol blend may be used, as is, but preferably is used in a hydrocarbon oil. Suitable oils include low viscosity crude oils, heavy naphthas, kerosenes, diesel fuels, heating oils, white oils, low level crack residums, liquified petroleum gases, toluene, xylene, and the like. The use of No. 2 diesel fuel oil, toluene, xylene, or similar low viscosity petroleum is generally preferred.

Preparatory to field use, the solvent blend is mixed with the oil at the well site in a volume ratio of about nine parts oil per part of solvent blend. The field mixing of the components including other additives may be performed "on the run" or may be premixed in a suitable tank. The injection of the treating agent will be performed at matrix pressures (to avoid fracturing the formation) using techniques familiar to those skilled in the art.

SAND CONSOLIDATION

As demonstrated by the laboratory experiments described above, the strength of the consolidation treatment and the extent of resin penetration may be improved by the use of a preflush solvent.

The preflush solvent may be utilized in conjunction with a variety of different resinous materials including the phenolformaldehyde type, the epoxy type, and the furfuryl alcohol and urea formaldehyde type resins.

The phenolformaldehyde type resins are prepared by the reaction of formaldehyde, acetaldehyde, propionaldehyde, or a mixture of water soluble aldehydes with a low molecular weight hydroxyaryl compound such as phenol, cresol, B-naphthol, resorcinol, xylenol, cresylic acid or a mixture of such compounds in a weight ratio between 1:1 and 9:1. The reaction of these materials can be catalyzed by the addition from about 2% to about 10% by weight based on the aldehyde hydroxyaryl compound mixture of an alkaline catalyst or an acid catalyst. The types and amounts of the catalyst and the composition of the phenolformaldehyde resins have been described at length in the art and are well known to those skilled in the art.

The epoxy resin useful for the purpose of this invention includes the diglycidyl ethers of bisphenol-A [bis(4-hydroxy phenol) dimethyl methane] obtained by the reaction of epichlorohydrin (1-chloro-2,3 epoxy propane) and bisphenol-A in the presence of an alkali such as sodium hydroxide or potassium hydroxide. Similar resins can be prepared by reacting mononuclear di- or tri- hydroxy phenol such as resorcinol, hydroquinone, pyrocatechol, or phloroglucinol or a polynuclear polyhydroxy phenol such as 4,4-dihydroxy biphenyl with a halohydrin such as 1,2-dichloro-3-hydroxy propane or dichlorohydrin. Still other satisfactory materials include the commercial epoxy resins prepared by the condensation of novolac resins with epichlorohydrins.

The epoxy resins are cured by curing agents or catalysts. Amine catalysts such as diethylene triamine, ethylene diamine and the like may be employed. Also usable are acidic catalysts including oxalic acid, phthalic acid and the like.

The epoxy resins may be used in a single stage operation wherein a mixture of the resin in a suitable diluent such as alcohol, acetone, ethyl ketone, kerosene, diesel oil, white oil, or mixtures of these, along with the catalyst is injected into the formation. Alternatively, the epoxy resins may be placed in a two-stage operation where the resin dispersed in a suitable diluent is injected into the formation followed by the catalyst or curing agent dissolved in a hydrocarbon carrier such as white oil. The catalyst solution displaces the resin into the formation and imparts the desired permeability to the invaded pore spaces. The catalysts (or curing agent) is extracted by the resin in contact with the sand grains. This causes the resin to harden, bonding the sand grains together.

The furfuryl alcohol formulations are generally utilized by injecting furfuryl alcohol, furfuryl alcohol resins or a mixture of the alcohol and resin into the formation and thereafter pumping in an oil overflush solution containing a low molecular weight organic acid such as trichloroacetic acid or delayed acid producing chemical as a catalyst or curing agent.

The urea formaldehyde resins are employed by injecting an aqueous solution containing urea, formaldehyde, an accelerator such as ammonium sulphate or ammonium chloride, and a retarder such as ammonium hydroxide hexamethylene tetramine into the formation and allowing the material to set. Magnesium chloride or similar chloride salt can be added to facilitate polymerization in carbonate formations.

The various resins, resin solutions, catalyst solutions, and overflush solutions employed in such treatments may also include other additives such as coupling agents. The volumes of resin solution, mixing techniques and injection procedures for the above resin type treatments have been described at length in the literature and are well known to those skilled in the art. Most of the resin types described above are commercially available from various service companies.

The poly(ethylene glycol) alkyl ethers as utilized in carrying out sand consolidation treatments will be employed as a preflush agent either in undiluted form or in a suitable organic diluent such as a $C_1$–$C_4$ alkyl alcohol, acetone and ethylene glycol monobutyl ether or hydrocarbon oil. The preferred diluent is isopropanol present in an amount to provide a polyglycol ether/alcohol weight ratio of 1:1 to 1:10. As mentioned previously, the diluent particularly isopropanol not only reduces the cost of the solvent but improves the hydrophilic character of the solvent. The quantity required for optimum results will normally depend, in part, on the permeability, porosity, and clay content of the formation, on the composition of the fluids in the formation, upon the particular polyglycol ethers or ether solutions selected, or upon particular resins or mixtures of resins forming constituents to be used. Use of from about 10 to about 50 gallons per foot formation thickness of poly(ethylene glycol) alkyl ether may be employed in undiluted form. If diluted, the treatment volumes required to achieve the desired results may be somewhat larger. For example, a 3:1 blend (by weight) of isopropanol and polyglycol ether may require from 30 to 150 gallons per foot of formation thickness.

It should be noted that the sand consolidation treatment may be used with other treatments such as sandstone acidizing as described above in connection with laboratory tests. It has been found that by treating the formation with HCl and mud acid, materials such as iron oxide or other materials that would affect the wettability or bonding of the resin to the sandstones are removed. In addition, pretreatment with acid solution removes clays, salts and other fines that could detrimentally affect the consolidation by resins.

The present invention may also be employed in the placement of sand or resin coated sand in surrounding relation to the wellbore and thereafter treating with the preflush and sand consolidating agents.

SANDSTONE ACIDIZING

Sandstone acidizing involves the injection of an acid reactive with clays or formation fines thereby increasing the permeability of the formation in the affected zone. A solvent employed in the acid solution or as an afterflush should remove and prevent the occurrence of emulsion blocks in the formation and should condition the formation to have a resulting high relative permeability to oil. Consequently, the solvent should have the following properties: it should leave the formation particles and dispersed fines water wet; it should be capable of causing water and oil to be miscible in its presence. In addition, it should cause no detrimental interaction with acid solution components and should be a good solvent for oil wetting materials.

The laboratory experiments described above indicate that the polyglycol ethers proposed for use in the present invention satisfy all of these properties and therefore are particularly suited for use as an afterflush in sandstone acidizing treatments.

As mentioned previously the polyglycol ethers useful in sandstone acidizing may be used in undiluted form but preferably are mixed with a suitable diluent prior to use. A particularly suitable composition includes 70% by weight of tetraethylene glycol monohexyl ether, and 30% weight of an alcohol such as isopropanol alcohol. The ether-alcohol blend may be used, as is, or it may be further diluted with a hydrocarbon oil. Suitable oils include low viscosity crude oils, heavy naphthas, kerosenes, diesel fuels, heating oils, white gas oils, low level crack residuals, liquified petroleum gases, toluene, xylene and the like. The use of No. 2 diesel fuel oil, toluene, xylene, or a similar low viscosity petroleum fraction is generally preferred.

The sandstone acidizing treatment normally involves the injection of three fluids into the formation: a preflush, mud acid, and an afterflush. The preflush which may be a 15% HCl displaces connate fluids from the zone to be acidized and thereby prevents carbonaceous minerals from reacting with subsequent hydrofluoric acid. The mud acid includes from 2 to about 6% by weight of hydrogen fluoride and from 9 to 13% by weight of hydrogen chloride. The normal composition of mud acid is 3% HF and 12% HCl. The quantity of mud acid injected into the formation will vary depending upon the composition of the formation, permeability of the formation, and the extent of formation damage, but normally will range between about 50 to 500 gallons per foot of formation thickness. The composition of the preflush and mud acid, and the injection procedure and volumes may be in accordance with known techniques described at length in U.S. Pat. No. 3,548,945.

The amount of afterflush solvent depends in part on the particular solvent selected and the particular formation to be treated. In general, however, it is preferred to add the solvent (e.g. polyglycol alkyl ether or polyglycol alkyl ether/alcohol blend) to the hydrocarbon oil in a quantity such that the ratio of the volume of the solvent to the volume of the oil is from about 0.02:1 to about 1:1 and then inject from about 1/10 to about 10 volumes of the resulting solution as an afterflush for each volume of acid used. It should also be realized that the solvent may be injected and immediately followed by the hydrocarbon oil.

The preflush, mud acid, and afterflush may also include other additives such as corrosion inhibitors, demulsifying agents, and the like.

Although the foregoing describes certain practical applications of the present invention, it will be realized by those skilled in the art that the $C_4$–$C_{10}$ alkyl ethers or a polyglycol containing from 10 to 22 carbon atoms per molecule may be used with advantage in most any well treating operation wherein it is desired to displace connate fluids radially outwardly from the immediate vicinity of the wellbore, dissolve deposits in the formation, or render formation particles water wet.

We claim:

1. A method of treating a subterranean formation surrounding a well which comprises injecting into said formation a treating composition which includes, as a minor weight fraction of said composition, a $C_4$–$C_{10}$ alkyl ether of a polyglycol, said ether containing from 10 to 22 carbon atoms per molecule.

2. A method as defined in claim 1 wherein the polyglycol ether is a monoalkyl ether of poly(ethylene glycol) having the formula of:

$$H(OCH_2CH_2)_n OC_mH_{(2m+1)}$$

where $n$ ranges from 3 to 6, and $m$ ranges from 4 to 10.

3. A method as defined in claim 2 wherein the polyglycol ether is $C_4$–$C_8$ monoalkyl ether of tri or tetraethylene glycol.

4. A method as defined in claim 3 wherein said polyglycol ether is tetraethylene glycol monohexyl ether.

5. A method as defined in claim 3 wherein said polyglycol ether is triethylene glycol monobutyl ether.

6. A method as defined in claim 1 wherein said treating composition further includes an alcohol.

7. A method as defined in claim 6 wherein said alcohol is isopropanol.

8. A method of treating a subterranean formation surrounding a well which comprises injecting into said formation a solvent which includes mixed alkyl ethers prepared from the reaction of a $C_4$–$C_{10}$ alkyl alcohol and ethylene oxide in the weight ratio ranging from about 1:0.8 to about 1:2.5.

9. In a method for the consolidation of an incompetent formation surrounding a well wherein a resinous material is injected into the formation and allowed to harden, the improvement which comprises introducing a solvent which includes a $C_4$–$C_{10}$ monoalkyl ether of a polyglycol having from 10 to 22 carbon atoms per molecule into said formation and thereafter injecting said resinous material into said formation.

10. A method as defined in claim 9 wherein the solvent further includes an organic diluent.

11. A method as defined in claim 10 wherein said polyglycol ether constitutes a minor weight fraction of said solvent.

12. A method as defined in claim 11 wherein said diluent is isopropanol.

13. A method as defined in claim 9 wherein the polyglycol ether is a poly(ethylene glycol) monoalkyl ether having the formula of $$H(OCH_2CH_2)_n OC_mH_{(2m+1)}$$

where $n$ ranges from 3 to 6, and $m$ ranges from 4 to 10.

14. A method as defined in claim 13 wherein said ether is tri- or tetra- ethylene glycol monohexyl ether.

15. A method as defined in claim 13 wherein said polyglycol ether is triethylene glycol monobutyl ether.

16. In a method for the consolidation of an incompetent formation surrounding a well wherein a resinous material is injected into the formation and allowed to harden, the improvement which comprises introducing a solvent which includes a mixed polyglycol ether prepared from the reaction of a $C_4$–$C_{10}$ alkyl alcohol and ethylene oxide in the weight ratio ranging from about 1:0.8 to about 1:2.5.

17. In a method for improving permeability of a subterranean formation surrounding a well wherein a fluid reactive with formation materials is injected into said formation from the well, the improvement comprising injecting into said formation after said reactive fluid a solvent including a $C_4$–$C_{10}$ monoalkyl ether of a polyglycol, said ether being at least partially miscible in oil and water and containing from 10 to 22 carbon atoms per molecule.

18. A method as defined in claim 17 wherein said polyglycol ether is tri- or tetra- ethylene glycol monohexyl ether.

19. A method as defined in claim 17 wherein said polyglycol ether is triethylene glycol monobutyl ether.

20. A method as defined in claim 17 wherein the solvent includes an organic diluent.

21. A method as defined in claim 17 wherein said polyglycol ether is the reaction product of hexyl alcohol and ethylene oxide in a weight ratio of between about 1:0.8 to about 1:2.5.

22. A method as defined in claim 17 wherein said reactive fluid is an aqueous solution of an acid capable of attacking mineral constituents or deposits in said formation.

23. A method as defined in claim 22 wherein said aqueous acid solution includes HCl.

24. A method as defined in claim 17 wherein the polyglycol ether is a monoalkyl ether of poly(ethylene glycol) having the formula of $$H(OCH_2CH_2)_n O C_mH_{(2m+1)}$$

where $n$ ranges from 3 to 6, and $m$ ranges from 4 to 10.

25. A method as defined in claim 17 wherein said solvent includes as a constituent thereof a major volume proportion of an organic diluent.

26. A method as defined in claim 25 wherein said diluent includes an alcohol.

27. A method as defined in claim 26 wherein said alcohol is isopropanol.

28. In a method for improving permeability of siliceous formation surrounding a well which includes injecting an aqueous acid solution into said formation, the improvement comprising injecting into said formation after said aqueous acid solution an ether of a poly(ethylene glycol) prepared by reacting a $C_4$–$C_{10}$ alcohol with ethylene oxide in a weight ratio of between about 1:0.8 to about 1:2.5.

* * * * *